United States Patent [19]
McCormick
[11] 4,264,204
[45] Apr. 28, 1981

[54] METHOD AND APPARATUS FOR PREPARING FLUID SPECIMENS

[76] Inventor: James B. McCormick, 505 N. Lake Shore Dr., Chicago, Ill. 60611

[21] Appl. No.: 971,796

[22] Filed: Dec. 21, 1978

[51] Int. Cl.[3] .................... G01N 1/10
[52] U.S. Cl. .................... 356/246; 356/427
[58] Field of Search .................... 356/427, 246; 233/26

[56] References Cited

U.S. PATENT DOCUMENTS 3,778,171 12/1973 Chervenka .................... 356/427 X
3,844,662 10/1974 Froreich .................... 356/427 X

FOREIGN PATENT DOCUMENTS 565193 11/1932 Fed. Rep. of Germany .................... 233/26

*Primary Examiner*—John K. Corbin
*Assistant Examiner*—Matthew W. Koren
*Attorney, Agent, or Firm*—Fitch, Even, Tabin, Flannery & Welsh

[57] ABSTRACT

A container for collecting and processing fluid specimens for analysis includes an elongated tubular member defining an opening. A collection plate is removably secured in sealing engagement around the periphery of the opening. The container is adapted for insertion into a centrifuge cup for centrifugation and deposition of sediment upon the collection plate.

4 Claims, 4 Drawing Figures

METHOD AND APPARATUS FOR PREPARING FLUID SPECIMENS

The present invention relates generally to the field of analytical equipment, and more particularly to a novel container for collecting and preparing a fluid suspension specimen for analysis.

In the field of medicine, fluid specimens, such as urine, body fluids, and cellular suspensions, are regularly taken for the purpose of chemical, physical and morphological analyses. Conventionally, the samples are collected in containers, often those containers which will be transported to the laboratory. However, at the laboratory the samples are generally transferred to another container, frequently a specimen tube, in which the sample is centrifuged. Following centrifugation, the liquid is decanted and the sediment is separately removed from the centrifuged container. The sediment is then applied to a slide for fixing and staining, followed by analysis, such as under a microscope. The contamination hazards and potential losses inherent in such a collection-to-analysis apparatus and process are a continuing problem.

Naturally, whenever a sample is transferred from one container to another, there are inherent, yet unmeasurable, losses of material because a portion of the specimen remains in the original container. When the particular quantity of a certain type of cell or material in a specimen is significant, these unmeasurable losses detract from the accuracy of the analysis.

Also, in the course of any transfer, there is an increased probability of contamination from the new container, any intermediate equipment used in the transfer, and even from the atmosphere. Although these contamination risks can be reduced through proper sterilization procedures, the risks nevertheless exist and must be controlled.

In those situations in which cellular matter is included in the specimen, transfers increase the possibility of physical damage to the cells, particularly in the case of scraping or scooping material from the bottom of a tube. Damage to a substantial number of cells can seriously distort a morphological analysis.

Furthermore, every transfer presents at least the possibility that the entire specimen will be lost through careless handling, such as by spilling. Such an accident frequently requires a return to the patient for another specimen. In cases where time is of the essence, such duplicative procedures are wholly unacceptable.

It is therefore an object of the present invention to provide a method and apparatus for minimizing the handling and transfer of fluid specimens from collection to analysis. It is also an object to provide a container for collecting, transporting and preparing a biological specimen for analysis.

Further objects and advantages will become apparent when the following detailed description is considered with reference to the accompanying drawings, in which.

Figure 1:
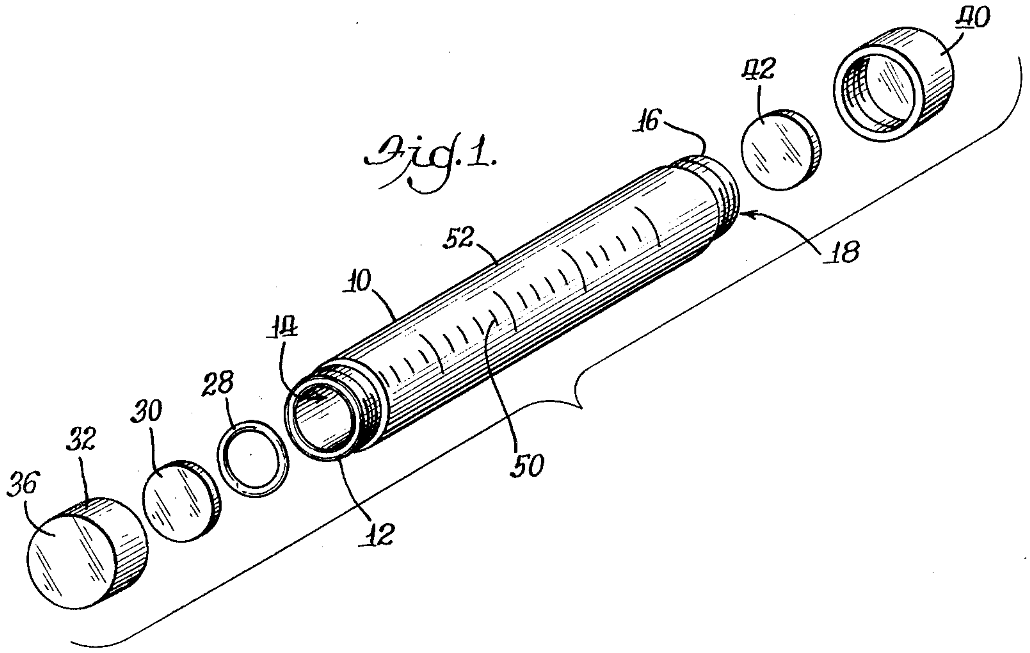
FIG. 1 is an exploded perspective view of a container embodying various features of the present invention.
Figure 2:
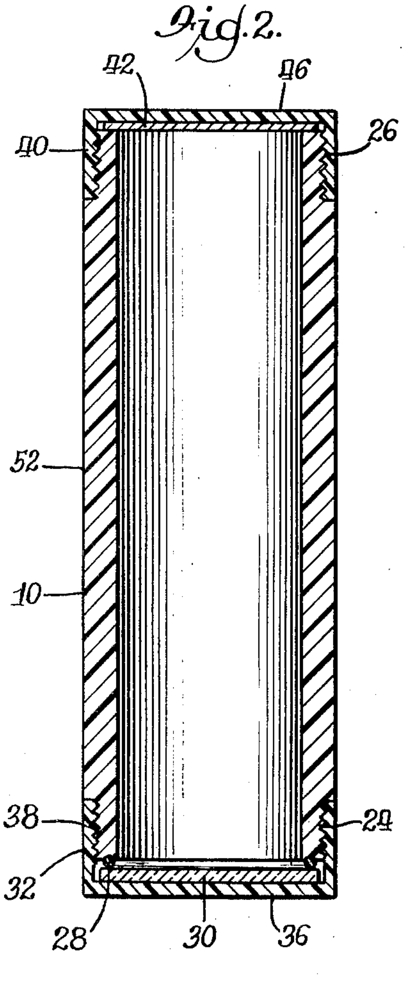
FIG. 2 is a longitudinal sectional view of a container constructed in accordance with one embodiment of the present invention.
Figure 3:
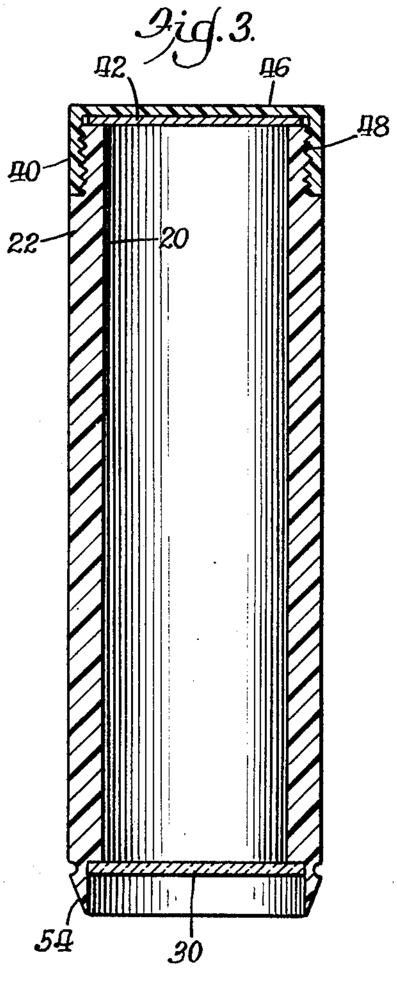
FIG. 3 is a longitudinal sectional view of a container constructed in accordance with another embodiment of the present invention, the container being shown in an intermediate stage of assembly.
Figure 4:
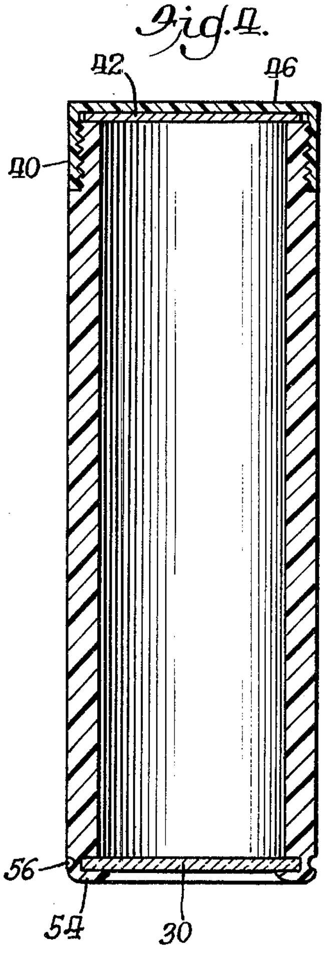
FIG. 4 is a longitudinal sectional view of the container shown in FIG. 3 but in completed form.

Generally, a container in accordance with the present invention includes an elongated tubular member defining a first opening. A collection plate is removably secured in sealing engagement around the periphery of the first opening and covering the first opening. The container is adapted for insertion into a standard centrifuge trunnion cup of the type employed in analytical laboratories.

Referring more particularly to the drawings, in one embodiment an elongated cylindrical tubular member 10, comprising glass or high impact plastic, includes a first edge 12 defining a generally circular first opening 14 and a second edge 16 defining a generally circular second opening 18. The tubular member 10 has an inner surface 20 and an outer surface 22.

The portion of the outer surface 22 adjacent the first edge 12 is generally cylindrical in shape and has an integral helical thread 24 formed thereon. The edge 12 is planar and lies in a plane perpendicular to the axis of the tubular member 10.

The portion of the outer surface 22 adjacent the second edge 16 is generally cylindrical in shape and has an integral helical thread 26 formed thereon. The second edge 16 is planar and lies in a plane perpendicular to the axis of the tubular member 10.

A circular sealing ring 28, an O-ring comprising an inert, compressible material, non-permeable to gases and liquids employed in the collection and preparation of a specimen, is disposed around the entire periphery of the first opening. The sealing ring 28 preferably has an internal diameter which is greater than the diameter of the first opening 14 and has an external diameter which is less than the external diameter of the tubular member 10 at the first edge 12.

A rigid planar collection plate 30, having a diameter greater than the internal diameter of the sealing ring 28 and less than the external diameter of the tubular member 10 at the first edge 12, comprises an optically non-distortive material, such as glass or acrylic. The collection plate 30 also has surface properties to permit adhesion of sediment, particulate and cellular material, after centrifugation. For example, glass and plastics used for microscopic slides are often treated by strong oxidation to promote adhesion.

The collection plate 30 is secured in sealing engagement with the sealing ring 28 in a position perpendicular to the axis of the tubular member 10 by means of a first removable sealing cap 32. The first sealing cap 32 is generally cylindrical in shape and closed at one end by the end wall 36. The internal diameter of the sealing cap 32 is slightly greater than the external diameter of the threaded portion of the tubular member 10 adjacent the first edge 12. The internal surface of the sealing cap 32 has an integral helical thread 38 formed thereon adapted to threadably engage the tubular member first thread 24.

The second opening 18 is sealed by removable sealing means, such as a second removable sealing cap 40 and an inert, compressible, non-permeable gasket 42 disposed between the cap 40 and the second edge 16. The second cap 40 is generally cylindrical in shape and closed at one end by the end wall 46. The second sealing cap 40 has an internal diameter which is slightly greater than the external diameter of the threaded portion of the tubular member 10 adjacent the second edge 16 and has an integral internal helical thread 48 formed thereon adapted to threadably engage the tubular member second thread 26.

The gasket 42, comprising an inert, compressible material, non-permeable to gases and the liquids employed in the collection and preparation of specimens, is disc-like in shape, having a diameter greater than the diameter of the second opening 18 and preferably less than the internal diameter of the second cap 40.

In use, the first opening 14 is sealingly covered by the collection plate 30, which is secured in position against the sealing ring 28 by the threadably secured first sealing cap 32. The collection plate is protected against deformation or breakage by the end wall 36 of the first sealing cap 32. Preferably, the first opening 14 is thus covered by the manufacturer prior to shipment to the user in order to prevent contamination and improper assembly. The second cap 40 and gasket 42 are removed from the tubular member 10 and the fluid specimen is introduced into the tubular member. The precise amount of specimen introduced is determinable from volumetric measuring lines 50 provided on the outer surface 22 of the tubular member 10. A preservative of alcohol and ethylene glycol may or may not be added to the specimen, as desired. Thereafter the gasket 42 is placed over the second opening 18 and the second sealing cap 40 threadably secures the gasket to the tubular member 10, completing the sealed container, which is then transported to a laboratory for preparation and analysis.

The shape and size of the sealed container are such that it is adapted to be slidably received within a standard centrifuge trunnion cup for centrifugation. In particular, the sealing caps preferably have outer diameters which are approximately equivalent to the outer diameter of the central portion 52 of the tubular member 10. Thus, the container fits securely within a centrifuge trunnion cup. When the container is received at the laboratory, reagents may or may not be added through the second opening 18, depending upon the particular analysis being performed. The container is inserted into a centrifuge trunnion cup, leading with the end carrying the first sealing cap 32 and the collection plate. Following centrifugation, the container is removed from the trunnion cup, the second sealing cap 40 is threadably removed, the gasket 42 is removed, and the liquid portion of the sample is decanted. The solid portion of the sample, the sediment, remains deposited upon the collection plate 30.

The sediment is preferably fixed while the collection plate 30 remains secured to the tubular member 10, such as by the introduction of formalin vapor or alcohol vapor, for example. In addition, it is preferable to stain the sediment while the collection plate 30 remains secured to the tubular member 10, by the sequential condition of staining reagents well known in the art. The particular reagents used depend upon the contents of the sediment and the analysis performed.

Thereafter, the first sealing cap 32 is threadably removed, freeing the sample plate 30, which is then lifted from the sealing ring 28, mounted as a cover slip upon a standard microscope slide, and analyzed by standard optical methods.

In an alternative embodiment requiring no first sealing cap, the tubular member 10 extends beyond the first edge 12 by a distance greater than the thickness of the collection plate 30, defining a generally cylindrical extension 54 comprising a deformable material, such as a thermoplastic material. The container is assembled, preferably by the manufacturer, by inserting the collection plate 30 within the extension 54 until it is seated upon the first edge 12. The extension 54 is then deformed, such as by the application of heat, to sealingly secure the collection plate 30 in the seated position. After a collected sample has been centrifuged and decanted, the collection plate is released for analysis by removing the deformed extension 54 from the container.

Preferably, an indented region, a fault 56, is defined around the outer surface of the extension 54 adjacent the first edge 12 to provide a weakened area to facilitate removal of the extension. A heated wire, or a cutting tool like those used to cut copper tubing, is applied to the tubular member within the fault 56 to sever the extension 54 and release the collection plate 30.

Employing containers such as those described herein, a specimen is collected in one container and does not further contact the atmosphere or another container or implement until after centrifugation, when the liquid portion of the sample is decanted. The sediment need not contact a surface other than the interior surfaces of the container until after it has been fixed and stained, when the collection plate is mounted upon a slide. The occasions for contamination and/or loss of samples are thus reduced substantially.

While the invention has been described with particular reference to specific embodiments, it is to be understood that it is not limited thereto, but is to be construed broadly and restricted by the scope of the appended claims.

What is claimed is:

1. A container for collecting and processing specimens for analysis, said container comprising an elongated tubular member defining a first opening and having an inner surface and outer surface, a collection plate, and a generally cylindrical tubular extension of said tubular member which extends beyond said first opening, said extension being deformable to removably secure said collection plate in sealing engagement with said tubular member around the periphery of said first opening.

2. A container according to claim 1 wherein a fault is defined around the outer surface of said extension adjacent to said periphery of said first opening to provide a weakened area to facilitate removal of said extension.

3. A container as defined in claim 1 wherein said tubular member defines a second sealable opening including means for removably sealing said second sealable opening.

4. A container as defined in claim 1 wherein said collection plate is transparent whereby said collection plate is adapted for use as a cover slip upon a microscope slide.

* * * * *